(12) United States Patent
Hakansson et al.

(10) Patent No.: US 7,500,018 B2
(45) Date of Patent: Mar. 3, 2009

(54) EFFICIENT IN-BAND SIGNALING FOR DISCONTINUOUS TRANSMISSION AND CONFIGURATION CHANGES IN ADAPTIVE MULTI-RATE COMMUNICATIONS SYSTEMS

(75) Inventors: Stefan Hakansson, Lulea (SE); Peter Blocher, Nuremberg (DE); Stefan Bruhn, Sollentuna (SE); Karl Hellwig, Wonfurt (DE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1006 days.

(21) Appl. No.: 10/676,342

(22) Filed: Oct. 1, 2003

(65) Prior Publication Data

US 2004/0062274 A1 Apr. 1, 2004

Related U.S. Application Data

(63) Continuation of application No. 09/444,368, filed on Nov. 22, 1999, now abandoned.

(60) Provisional application No. 60/109,694, filed on Nov. 24, 1998.

(51) Int. Cl.
*G06F 15/173* (2006.01)
*H04J 3/16* (2006.01)

(52) U.S. Cl. ............... 709/246; 709/224; 370/468; 370/435; 704/200

(58) Field of Classification Search ............... 370/435, 370/337, 356, 468; 704/205, 200; 709/246, 709/224

See application file for complete search history.

(56) References Cited

U.S. PATENT DOCUMENTS 5,404,573 A 4/1995 Yabe et al.

(Continued)

FOREIGN PATENT DOCUMENTS

EP 749256 A2 12/1996

(Continued)

OTHER PUBLICATIONS

Digital Cellular Telecommunication System; Codec Adaptation for Adaptive Multi-Rate Speech Traffic Channels; Draft ETS 300 XXX AMR; ETSI Standards, European Telecommunications Standards Institute, Sophia-Antipolis, FR; Oct. 1998, XP014025029; ISSN: 0000-0001.

(Continued)

*Primary Examiner*—Jungwon Chang

(57) ABSTRACT

Techniques for discontinuous transmission (DTX) and fast in-band signaling of configuration changes and protocol messages in speech communications systems provide cost efficiency in terms of radio transmission capacity, in terms of fixed line transmission, and in terms of implementation effort. An exemplary method for performing discontinuous transmission (DTX) in a communications system in which source data is interleaved for transmission from a first component in the system to a second component in the system includes the steps of detecting periods of source data inactivity, and transmitting silence descriptor (SID) frames from the first to the second component during the periods of source data inactivity, certain of the transmitted SID frames being interleaved using a different interleaving algorithm as compared to that used for source data. For example, the source data can be block diagonally interleaved, and certain of the SID frames can be block interleaved. An exemplary method for effecting configuration changes in a communications system includes the step of transmitting an escape frame in place of a speech data frame, the escape frame including a gross bit pattern to distinguish the escape frame from speech data frames and conveying a configuration change indication. The escape frame can further include a data field to indicate a particular configuration change to be made. For example, where the communications system is an AMR system, an escape frame can be used to change an active codec mode set. Alternatively, an escape frame can be used to change a phase of codec information.

29 Claims, 12 Drawing Sheets

U.S. PATENT DOCUMENTS

| | | | |
|---|---|---|---|
| 6,134,220 A | | 10/2000 | Le Strat et al. |
| 6,269,331 B1 | * | 7/2001 | Alanara et al. ............ 704/205 |
| 6,347,081 B1 | * | 2/2002 | Bruhn ....................... 370/337 |
| 6,452,941 B1 | | 9/2002 | Bruhn |
| 6,477,176 B1 | * | 11/2002 | Hamalainen et al. ....... 370/435 |
| 6,570,871 B1 | * | 5/2003 | Schneider ................. 370/356 |

FOREIGN PATENT DOCUMENTS

| | | |
|---|---|---|
| EP | 0863682 A1 | 9/1998 |
| WO | WO 9809454 | 3/1998 |

OTHER PUBLICATIONS

"Digital Cellular Telecommunications System (Phase 2); Inband Control of Remote Transcoders and Rate Adaptors for Enhanced Full Rate (EFR) and Full Rate Traffic Channels" (GSM 08.60 version 4.4.1); ETS 300 597; Mar. 1998—Third Edition; pp. 1-30.

"Digital Cellular Telecommunications System; Adaptive Multi-Rate (AMR) Channel Coding" ETS 300 909 AMR; European Telecommunication Standard (Draft); Sep. 1998.

Bruhn, S. et al.,: "Continuous and discontinuous power reduced transmission of speech inactivity for the GSM system" Lobal Telecommunications Conference, 1998, GLOBECOM 1998, The Bridge to Global Integration, IEEE Sydney, NSW, Australia, Nov. 8-12, 1998, Piscataway, NJ, USA, IEEE, US, Bd. 4, 8. Nov. 8, 1998, pp. 2091-2096, XP010339312, ISBN: 0-7803-4984-9.

Walke, Berhard: Mobilfunknetze und ihre Protokolle, Stuttgart: Teubner, Bd. 1 Grundlagen, GSM, UMTS and andere zellulare Mobilfunknetze, Chapter 3.3.7 "Schicht 1: Bitbertragung", pp. 172-184, 1998-00-00, ISBN 3-519-06430-8, XP002398491.

* cited by examiner

EFFICIENT IN-BAND SIGNALING FOR DISCONTINUOUS TRANSMISSION AND CONFIGURATION CHANGES IN ADAPTIVE MULTI-RATE COMMUNICATIONS SYSTEMS

CROSS-REFERENCE TO RELATED APPLICATIONS

This application is a continuation of Ser. No. 09/444,368 filed on Nov. 22, 1999, which claims the benefit of U.S. Provisional Application No. 60/109,694, filed Nov. 24, 1998, both of which are incorporated herein in their entirety be reference.

FIELD OF THE INVENTION

The present invention relates to communications systems, and more particularly, to discontinuous transmission (DTX) and configuration changes in adaptive multi-rate communications systems.

BACKGROUND OF THE INVENTION

Today, multi-mode coding systems employing at least two different source and channel codec modes can be used to maintain near-to-optimum communication quality under varying transmission channel conditions. A mode with low source coding bit rate and a high degree of channel error protection can be chosen for bad channels. On the other hand, good channels allow selection of a codec mode with high source coding bit rate and a relatively low degree of error protection.

As is well known in the art, such multi-mode coding systems must convey (either explicitly or implicitly) the actually chosen codec mode to a receiving decoder to enable proper decoding of received data. Two-way communication systems with codec mode adaptation have additionally to transmit similar information over the return link. This is either quantized link measurement data describing the present forward channel state, or a corresponding codec mode request/command taking the channel state account. Such link adaptation data is known in the art as codec mode information, consisting of codec mode indications (the actually selected codec mode) and codec mode requests/commands (the codec mode to be used on the transmitting side). The evolving Global System for Mobile Communication (GSM) Adaptive Multi-Rate (AMR) standard employs the above described codec mode adaptation.

In such AMR systems, in-band signaling is used to reallocate parts of the speech transmission resource for transmitting control information. It is applied where no other suitable control channels are available. The GSM AMR speech coding standard is an example which makes use of in-band signaling. It uses parts of the GSM speech traffic channel for the transmission of AMR link adaptation data. More specifically, the GSM AMR standard provides an in-band channel for the transmission of codec mode information.

Codec mode information consists of codec mode requests/commands and codec mode indications, which are transmitted every second frame (every 40 ms), in alternating order. Codec mode information identifies a codec mode in a subset of up to 4 codec modes out of 8 (for adaptive full-rate speech, or AFS) or 6 (for adaptive half-rate speech, AHS) available modes. These codec mode subsets are referred to as active codec sets.

In any communication system, including the above described GSM AMR system, transmission capacity is a limited and costly resource. For this reason, in order to save transmission capacity, Discontinuous Transmission (DTX) is widely applied when transmitting speech. Sometimes DTX is referred to as Voice Operated Transmission (VOX). The basic principle of DTX is to turn off transmission during speech inactivity. Instead, so-called comfort noise (CN) parameters are transmitted which enable the decoder to reproduce the inactivity signal, which usually is some kind of background noise. CN parameters require much less transmission resource than speech. DTX is also an important feature for mobile telephones as it allows turning off power consuming devices (such as radio transmitters) during inactivity. Doing so helps to save battery power and to increase the talk time of the phones.

In two-way communication systems employing DTX, there will typically be one link active while the other link is inactive (as one speaker is talking while the other is listening). The active link has, with some reduced frame transmission rate, to convey silence descriptor (SID) frames (also known as background information, or comfort noise, descriptor frames) to the receiver. SID frames contain CN parameters and enable a receiver to generate a comfort noise silence signal, for example to reassure a listening user that the connection is still active.

In the present GSM speech coding standards FR, HR and EFR, DTX is realised in a very similar way. By way of example, the state of the art of DTX operated speech communication in the GSM system will be described with respect to the GSM EFR codec. For additional information, see for example the GSM 06.11, GSM 06.12, GSM 06.21, GSM 06.22, GSM 06.31, GSM 06.41, GSM 06.61, GSM 06.62, and GSM 06.81 standards, and related documents. The GSM EFR scheme is characterised as follows:

End of speech activity is signaled by the transmission of a first SID frame, which is not phase-aligned to the SACCH. Rather, it is immediately following the last active speech frame. After such a first SID frame, update SID frames are transmitted with a period of once per 24 frames (=480 ms). Update SID frame transmission is aligned with the time alignment flag (TAF), which is generated in the radio subsystems and which is derived from the SACCH frame structure. Apart from SID frames, no other frames are transmitted during inactivity. Simply resuming the transmission of active speech frames ends the inactivity period.

The RSS handles SID frames as regular speech frames. This means in particular that the same channel coding and diagonal interleaving is used as for speech frames. A number of effectively fourty-three (43) net bits is used for the comfort noise parameters which describe spectral shape and gain of the inactivity signal. Ninety-five (95) net bits are used for a special SID bit pattern to identify the frame as a SID frame and to make it distinct from speech frames. CN parameters are differentially encoded with respect to parameters, which are derived from the last transmitted speech frames.

The described SID frame transmission is illustrated in FIG. 1 for TCH/FS (i.e., traffic channel/full-rate speech) and in FIG. 2 for TCH/HS (i.e., traffic channel/half-rate speech). The upper row symbolises the speech frames, as they are seen at the input of the speech encoder. The middle row symbolises the TDMA frames that transmit the respective speech or SID bits via the radio interface. The lower row symbolises the speech or comfort noise frames after the speech decoder. Every speech frame is exactly 20 ms long. The TDMA frames have in average a distance of exactly 5 ms. TDMA frames for SACCH and IDLE are not shown. Implementation delays and other side effects are not shown either.

Apart from regular transmission of SID frames, synchronously and time aligned to a fixed time structure, ITU-T recommendation G.729/Annex B describes a DTX method which transmits SID frames whenever an update of the CN parameters is required because they have changed significantly since the last SID frame transmission.

In the well known Pacific Digital Cellular (PDC) system with VOX functionality, special post- and pre-amble frames are used to signal transitions from speech to inactivity or, respectively, back from inactivity to speech (see, for example, RCR STD-27D). These frames contain unique bit patterns on gross bit level to identify them. Post-amble frames consist of two channel frames of which the first carries no other information than the identification bit pattern and of which the second carries comfort noise parameters describing the inactivity signal. During voice inactivity, post-amble frames are sent periodically to enable the receiving end to update the comfort noise generation. For both post- and preamble frames, the same interleaving is used as for speech frames.

The above described conventional DTX solutions, as realized in GSM FR, EFR, and HR, are not well suited for use in multi-mode coding systems. This results from the fact that SID frame signaling is done on net bit level. A special bit pattern identifying the SID frame is part of the net bit stream. The SID frame detection unit at the receiver is executed after de-interleaving and channel decoding. This approach is inappropriate for multi-mode coding systems with more than one source and channel mode since the SID frame identification would depend on the correct choice of the codec mode for channel decoding. The correct codec mode at the receiver can, due to possible mode transmission errors, not always be guaranteed.

Moreover, for analogue reasons, variations of the interleaving scheme, either for the different codec modes or for SID frames, are also impractical, for complexity reasons. Such approaches require in the worst case to run SID frame de-interleaving and, more severe, channel decoding in addition to speech frame de-interleaving and channel decoding.

Additionally, there are at least two major problems in adopting the PDC realization. Firstly, as post-amble frames consist of two traffic frames, the inactivity transmission mode is relatively inefficient in terms of transmission power savings. Each comfort noise parameter update requires the transmission of two frames. Secondly, as transitions from speech inactivity to activity are signaled by pre-amble frames, either parts of the speech onsets may be clipped or transmission of speech onsets is resumed delayed by the pre-amble frame. The former effect directly degrades the quality of the reconstructed speech while the latter increases the speech transmission delay which may cause degradations of the conversational quality.

Note also that applying a common diagonal interleaving scheme over two frames for SID and speech frames, as is presently done in both GSM and PDC, causes further problems. Applying diagonal interleaving for transmission of single SID frames is inefficient in terms of radio resource usage and power consumption since only one half of every transmitted TDMA frame carries SID information while the other half remains unused and is thus wasted (such wasted half bursts are marked in FIGS. 1 and 2).

This efficiency loss in current GSM and PDC systems is small as SID frame transmission is relatively seldom. However, it is more severe for new multi-mode communication systems with codec mode adaptation. High adaptation performance requires much more frequent information transmission (adaptation data) over the inactive link compared to the transmission of SID frames in current systems.

Moreover, there are certain upper limits of the radio channel activity during inactivity (e.g., the AMR system requirement is: TCH/AFS: 16 TDMA frames per 480 ms multiframe; TCH/AHS: 12 TDMA frames per 480 ms multiframe). Wasting half of the available radio resource would mean that codec mode information could only be transmitted half frequently than principally possible. The result is a potential performance loss due to slower codec mode adaptation.

A further disadvantage of applying the same diagonal interleaving for SID frames (carrying codec mode information) as for speech frames is the delay caused by this kind of interleaving. With respect to achieving the best possible performance of codec mode adaptation of the multi mode communication system, transmission delay of codec mode information should be kept at a minimum. This prohibits the usage of diagonal interleaving.

A particular problem in systems with DTX is the detection of speech onsets after periods of inactivity. Missing the onset results in clipped speech output of the decoder. On the other hand, if a non-transmitted frame is erroneously detected as a speech onset frame, undesirable plop or bang sounds can be produced which can degrade communication quality considerably.

In principle, AMR systems with DTX operation merely need to transmit codec mode requests for the currently active link over the inactive link. No codec mode indications for the inactive link need be transmitted. However, when the inactive link becomes active again, a suitable codec mode must be selected. A solution of how to select the codec mode for speech onsets after inactivity has to be found which ensures that transmitting and receiving side apply the same mode. Moreover, this codec mode should be suitable with respect to the current radio channel conditions.

Apart from the codec mode signaling method in the AMR standard, so far no further fast control channels are available. However, there is a need for such a channel in order to be able to perform fast configuration changes (e.g., to change an active codec set, to change the phase of codec mode information in order to minimize transmission delay, to handover to an existing GSM codec such as FR, EFR, or HR, and/or to switch to a future application such as a wideband codec, speech and data, or multi-media).

Accordingly, there is a need for improved methods and apparatus for performing DTX and configuration changes in adaptive multi-rate systems.

SUMMARY OF THE INVENTION

The present invention fulfills the above-described and other needs by providing novel solutions for DTX and fast in-band signaling of configuration changes and protocol messages, as well as the interaction of both operations, in the context of adaptive multi-rate systems. Advantageously, the disclosed methods and apparatus are cost efficient in terms of radio transmission capacity, in terms of fixed line transmission, and in terms of implementation effort.

An exemplary method for performing discontinuous transmission (DTX) in a communications system in which source data is interleaved for transmission from a first component in the system to a second component in the system includes the steps of detecting periods of source data inactivity, and transmitting silence descriptor (SID) frames from the first to the second component during the periods of source data inactivity, wherein certain of the transmitted SID frames are interleaved using a different interleaving algorithm as compared to that used for source data. For example, the source data can be block diagonally interleaved, and certain of the SID frames can be block interleaved.

The exemplary method can further include the steps of transmitting a first type of SID frame to indicate a transition from source data activity to source data inactivity, periodically transmitting a second type of SID frame during source data inactivity, and transmitting a third type of SID frame to indicate a transition from source data inactivity to source data activity. Advantageously, where the communications system is an adaptive multi-rate (AMR) system, the SID frames can include codec mode information in addition to silence description information.

An exemplary method for transmitting protocol messages from a first component to a second component in a speech communications system includes the step of transmitting an escape frame in place of a speech data frame, the escape frame including a gross bit pattern to distinguish the escape frame from speech data frames and conveying a protocol message. The escape frame can further include a data field to indicate to the second component a particular protocol message.

An exemplary method for effecting configuration changes in a communications system includes the step of transmitting an escape frame in place of a speech data frame, the escape frame including a gross bit pattern to distinguish the escape frame from speech data frames and conveying a configuration change indication. The escape frame can further include a data field to indicate to the second component a particular configuration change to be made.

For example, where the communications system is an AMR system, an escape frame can be used to change an active codec mode set. Alternatively, an escape frame can be used to change a phase of codec information.

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

DETAILED DESCRIPTION OF THE INVENTION

Although embodiments of the invention are described hereinafter with respect to speech transmission in the GSM system, those of skill in the art will immediately appreciate that the disclosed techniques are equally applicable in other contexts. For example, the invention is readily applied in any wireless or fixed-line communication system, including TDMA systems (e.g., D-AMPS), PDC, IS95, and the Internet.

Figure 1:
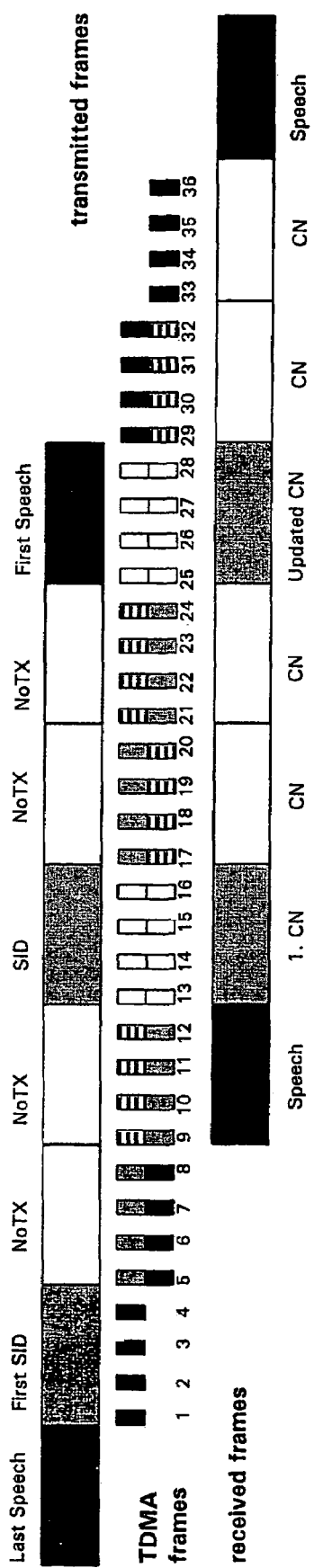
FIG. 1 depicts an exemplary full-rate silence descriptor (SID) frame transmission scheme according.
Figure 2:
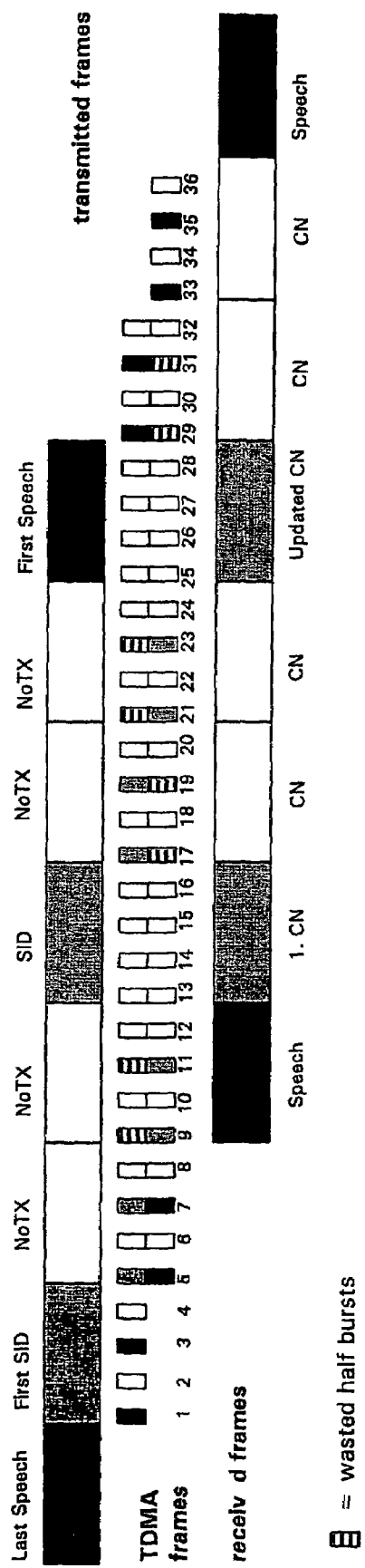
FIG. 2 depicts an exemplary half-rate silence descriptor (SID) frame transmission scheme.
Figure 3:
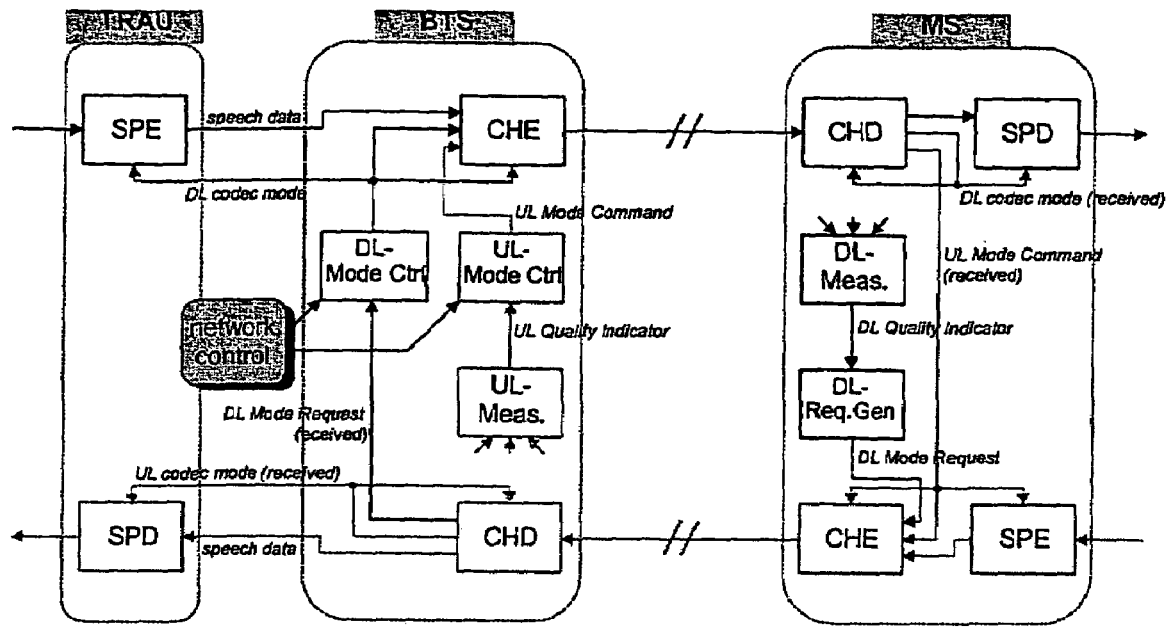
FIG. 3 depicts an exemplary adaptive multi-rate communications system in which the present invention can be implemented.

FIG. 3 depicts an exemplary AMR system in which the techniques of the present invention can be implemented. The exemplary AMR system includes a Transcoding and Rate Adaption Unit (TRAU) and a Base Station (BTS) on the network side, as well as a Mobile Station (MS). On the network side, a speech encoder (SPE) and a channel encoder (CHE), as well as a channel decoder (CHD) and a speech decoder (SPD), are connected via the well known serial A-bis interface. For each link, quality information is derived by estimating the current channel state. Based on the channel state, and also taking into consideration possible constraints from network control, the codec mode control, which is located on the network side, selects the codec modes to be applied.

The channel mode to use (TCH/AFS or TCH/AHS) is controlled by the network. Uplink and downlink always apply the same channel mode. For codec mode adaptation, the receiving side performs link quality measurements of the incoming link. The measurements are processed yielding a Quality Indicator. For uplink adaptation, the Quality Indicator is directly fed into the UL mode control unit. This unit compares the Quality Indicator with certain thresholds and generates, also considering possible constraints from network control, a Codec Mode Command indicating the codec mode to be used on the uplink. The Codec Mode Command is then transmitted in-band to the mobile side where the incoming speech signal is encoded in the corresponding codec mode.

For downlink adaptation, the DL Mode Request Generator within the mobile compares the DL Quality indicator with certain thresholds and generates a Codec Mode Request indicating the preferred codec mode for the downlink. The Codec Mode Request is transmitted in-band to the network side where it is fed into the DL Mode Control unit. This unit generally grants the requested mode. However, considering possible constraints from network control, it can also override the request. The resulting codec mode is then applied for encoding of the incoming speech signal in downlink direction.

Both for uplink and downlink, the presently applied codec mode is transmitted in-band as Codec Mode Indication together with the coded speech data. At the decoder, the Codec Mode Indication is decoded and applied for decoding of the received speech data.

Codec mode selection is done from a set of codec modes (ACS, Active Codec Set), which may include 1 to 4 AMR codec modes. Associated with this set is a list of 1 to 3 switching thresholds and hysteresises used by the DL Mode Request Generator and the UL mode control unit to generate the Codec Mode Requests and Codec Mode Commands. These configuration parameters (ACS, thresholds, hysteresises) are defined at call setup and can be modified at handover or during a call.

According to the invention, DTX in a system such as that shown in FIG. 3 is based on in-band signaling with three different frame types: SID_FIRST, regular SID, and speech onset frames. These frame types have in common that they use particular gross bit patterns, which identify them. Moreover, they can also convey payload data, which consists of CN parameters and codec mode information. For example implementations according to the invention, see GSM 05.03: Digital cellular telecommunications system (Phase 2+); Channel coding (draft ETSI EN 300 909 V7.2.0 (1999-11)) and GSM 06.93: Digital cellular telecommunication system (Phase 2+); Discontinuous Transmission (DTX) for Adaptive Multi-Rate (AMR) speech traffic channels (draft ETSI EN 301 707 V.7.2.0 (1999-11)), each of which is incorporated-herein in its entirety by reference.

SID frames are identified on gross bit level. SID frames are defined to be transmitted using k TDMA frames, i.e. they consist of k*114 bits. A suitable choice for k is 4. In this case SID frames consist of 456 bits, i.e. of one channel frame of 456 bits for TCH/AFS and of two channel frames of 228 bits each for TCH/AHS. Each SID frame has a SID frame identification field containing a unique bit pattern and two message fields. The one message field is reserved for channel encoded comfort noise (CN) parameters, the other for channel encoded codec mode information. The codec mode information field can carry codec mode requests only, or it can be further subdivided into two parts, one carrying codec mode requests/commands and the other carrying codec mode indications.

Figure 4:
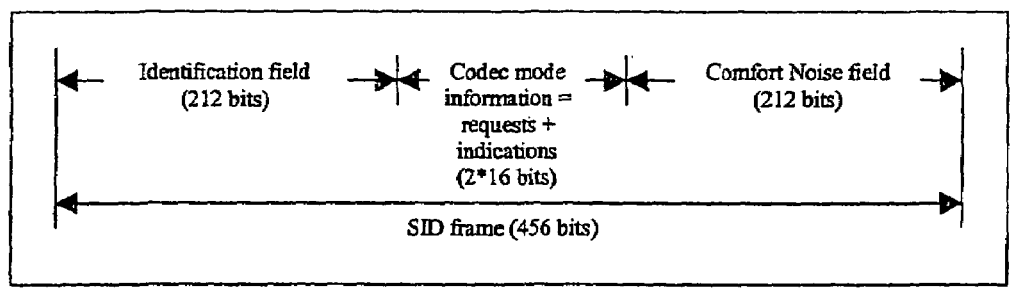
FIG. 4 depicts an exemplary SID frame format according to the present invention.

An example of the regular SID frame format definition is given in FIG. 4. In this example, the SID frame consists of a SID frame identifier of 212 bits, a field of 212 bits for the comfort noise parameters and a field of 32 bits for the codec mode information. In this example, it is assumed that the CN parameters are convolutionally encoded and the codec mode information consists of block encoded requests/commands and indications. In an alternative solution the two message fields can be put together, if, e.g., CN parameters and codec mode information are both encoded using the same convolutional or block code.

According to the invention, regular SID frames are block interleaved rather than diagonally. While this gives away possible interleaving gain (i.e., the transmission is potentially less robust against transmission errors), SID frames generally carry less information than regular speech frames, and they can therefore be protected using more powerful channel codes than used for speech transmission. This compensates for the loss in interleaver gain, or even makes SID frame transmission more robust than is possible for current solutions (GSM FR, EFR, or HR). Important information like codec mode information can, e.g., be protected by stronger channel codes (compared to the in-band transmission of codec mode information in regular speech frames). Furthermore, CN parameters are usually represented with much fewer bits than speech parameters. The few CN bits can thus be protected with lower rate channel codes. As an example, out of a number of 35 CN bits, all can be protected, first, by a 14 bit CRC code (which makes possible very powerful error detection), and then by using a rate ¼ convolutional code (constraint length k=5). Moreover, both CN parameters and codec mode information is generally relatively slowly varying information. Also taking into account the proposed SID frame rate (of every 8th frame), which is much higher than in existing solutions, occasional losses of a SID frame due to channel errors are even tolerable.

Figure 5:
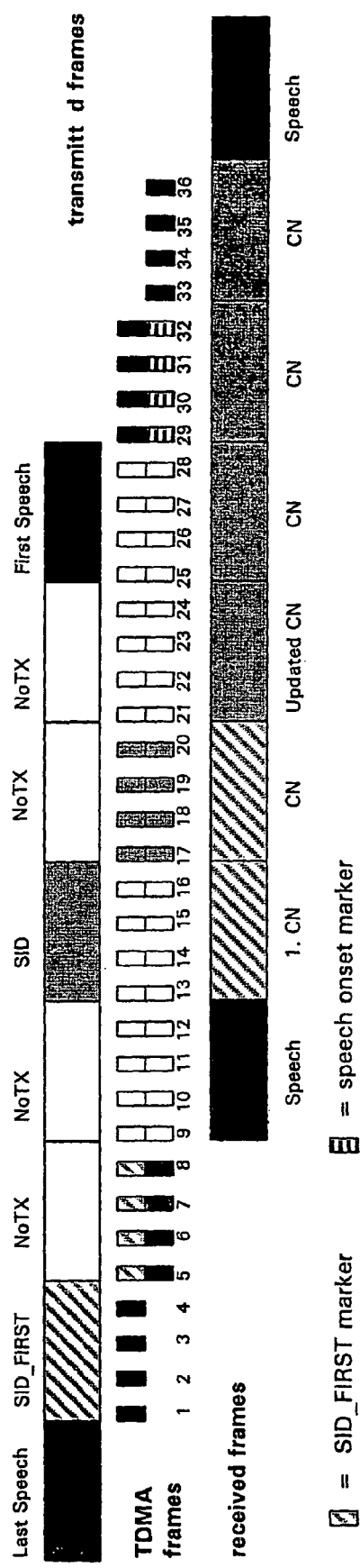
FIG. 5 depicts an exemplary full-rate SID frame interleaving scheme according to the present invention.
Figure 6:
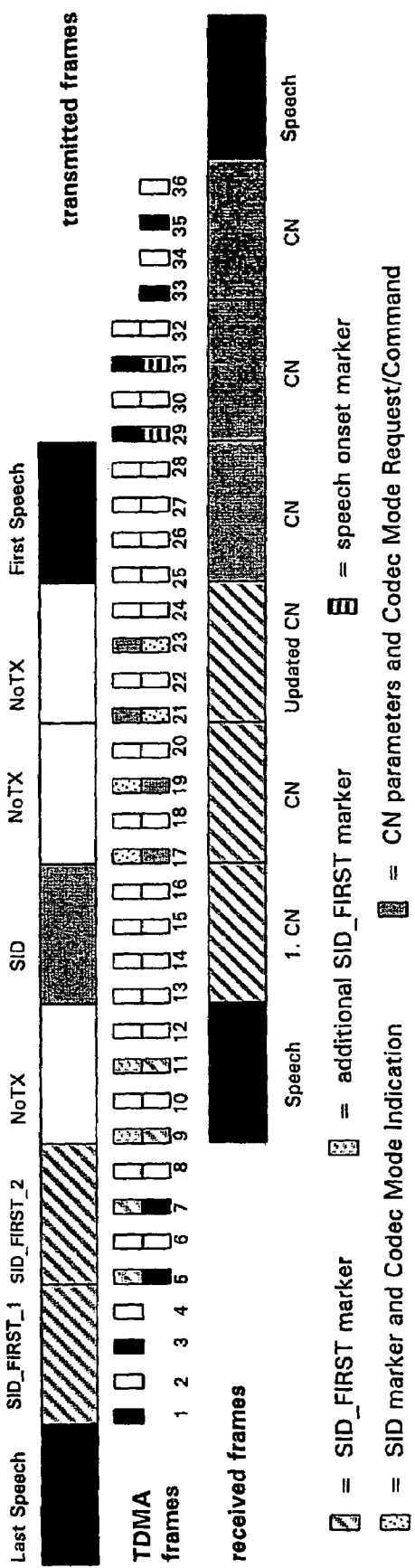
FIG. 6 depicts an exemplary half-rate SID frame interleaving scheme according to the present invention.

As shown in the respective FIGS. 5 and 6, for both TCH/AFS and TCH/AHS, SID frames consisting of 4*114 bits are mapped, according to the invention, by block interleaving onto 4 TDMA frames. The purpose of the interleaver is to distribute the SID frame bits in such a way onto the available TDMA frames that the robustness against transmission errors is maximized. The diagonal interleaver for speech frames is not used. As de-interleaving is not very demanding in terms of complexity, this solution with a particular block interleaver for SID frames is feasible. In the worst case, the decoder executes both SID frame block de-interleaving and conventional speech frame diagonal de-interleaving, but not more than one channel decoder. Advantageously, the problem in current GSM and PDC systems of wasted bits in the TDMA frames belonging to SID frames is thus solved.

For TCH/AFS, the actual block interleaving scheme for the SID frame is of relatively minor importance. In order to get a maximal interleaver gain, identification marker bits, as well as CN and codec mode information bits are distributed as equally as possible on the TDMA frames used for transmission.

For TCH/AHS, special cases can occur due to the fact that the SID frame is transmitted using 2 channel frames. As discussed in detail below with respect to SID inhibit frames, the situation can occur when the first half of the TDMA frames carrying the SID frame has been transmitted and the second half cannot be transmitted due to a speech onset. For this case, it is important to be able to inhibit the SID pattern, which has already been sent. This is ensured by transmitting the second half of the pattern bits on the odd positions of the second half of the TDMA frames. With respect to the codec mode information, it is important that the codec mode to be used for decoding the speech onset is available. This can be ensured by also transmitting the second half of the codec mode indication bits on the odd positions of the second half of the TDMA frames.

A possible solution is to map the pattern bits and the codec mode indication bits on the TDMA frames by using diagonal interleaving. Consequently, the CN bits and codec mode request/command bits are transmitted in the odd positions of the first half of the TDMA frames and in the even positions of the second half of the TDMA frames. The described interleaving scheme for SID frames on TCH/AHS is illustrated in FIG. 6.

Figure 7:
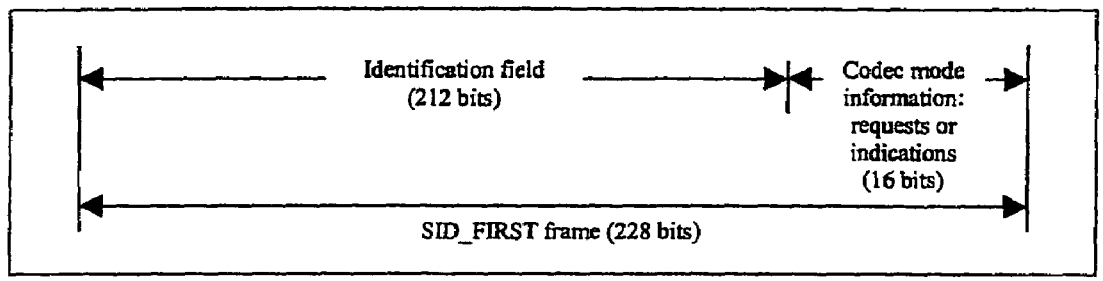
FIG. 7 depicts an exemplary first-SID frame format according to the present invention.

According to the invention, particular SID_FIRST frames are transmitted immediately after the last speech frame when going from activity to inactivity. The solution is merely to identify end of speech rather than also transmitting CN parameters. An example solution for TCH/AFS is to use a 228 bit field consisting of 212 marker bits and 16 bits for codec mode information, as shown in FIG. 7. The codec mode information is either request/command or indication, depending on what is in turn (if a speech frame had been transmitted). The type of codec mode information transmitted with the SID_FIRST frame thus depends on the frame number and the transmission phase of the codec mode information. A special interleaver maps the SID_FIRST frame onto the 228 bits available in the unused half bursts. FIG. 5 illustrates the described transmission scheme of the SID_FIRST frame for TCH/AFS. Note there are no longer wasted half bursts.

An analogue solution for TCH/AHS would transmit a SID_FIRST identification pattern and codec mode information on the 2 available usually unused half bursts. An example which makes the detection of SID_FIRST more reliable is, however, to use also the next 2 TDMA frames. This means that 2 channel frames SID_FIRST_1 and SID_FIRST_2 are transmitted. A possibly identical 228 bit frame as it is used in the TCH/AFS example solution (consisting of 212 marker bits and 16 bits for codec mode information, see FIG. 7) is mapped on the even positions of the TDMA frames, which carry the last speech frame (unused half bursts), and on the odd positions of the two subsequent TDMA frames. This kind of diagonal mapping allows application of the existing diagonal (de-)interleaver. The codec mode information is either request/command or indication, depending on the frame number and the transmission phase of the codec mode information. Transmitted is that kind of codec mode information, which would have been sent in the respective channel frame if speech had been transmitted. The mapping is done in a way that equal portions both of the pattern bits and the codec mode information bits are put on the first two and the second two used TDMA frames.

FIG. 6 illustrates a technique for increasing the reliability of SID_FIRST frame detection still further. According to the invention, the even positions of the additional two TDMA frames are filled with an additional identification pattern. It is also possible to use a part of these half bursts for the transmission of codec mode information. The identification pattern could also be the code word of the codec mode information, repeated that often that all available bits are used. If, e.g., 114 bits are available and the code word for the codec mode information is 16 bits wide, then it could be repeated 114/16 times.

Figure 8:
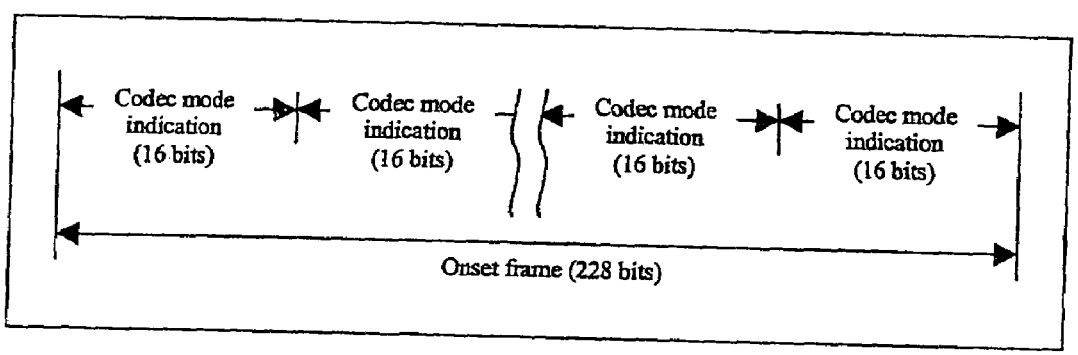
FIG. 8 depicts an exemplary speech-onset frame format according to the present invention.

The diagonal interleaving used for speech frames implies that the odd positions of the first half of the TDMA frames carrying the first speech frame after an inactivity period are free for other purposes. A solution improving onset detection, according to the invention, is to fill these bits with a special onset identification pattern. Moreover, parts of these bits can also be used for transmission of a codec mode indication that signals the codec mode according to which the first speech frame is encoded. A solution which both conveys an onset bit pattern and the codec mode indication is to repeat the codec mode indication code word that often that all available bits are used, as is illustrated in FIG. 8. An example for TCH/AFS is to repeat the 16 bit code word of the indication 228/16 times. For TCH/AHS, the 16 bit code word is repeated 114/16 times. Such an onset frame is mapped by a particular interleaver onto the otherwise unused half bursts. The respective frame transmission schemes both for TCH/AFS and TCH/AHS are depicted in FIGS. 5 and 6.

For TCH/AHS, regular SID frames and SID_FIRST frames are transmitted using 2 channel frames. Situations can thus occur in which a higher prioritized speech onset is transmitted after the first but before the second channel frame of the SID frame has been transmitted. In such a case, the error event could happen that the receiver misses the onset and instead detects a SID or, respectively, a SID_FIRST frame, even though it has actually only received the first half of it.

Figure 9:
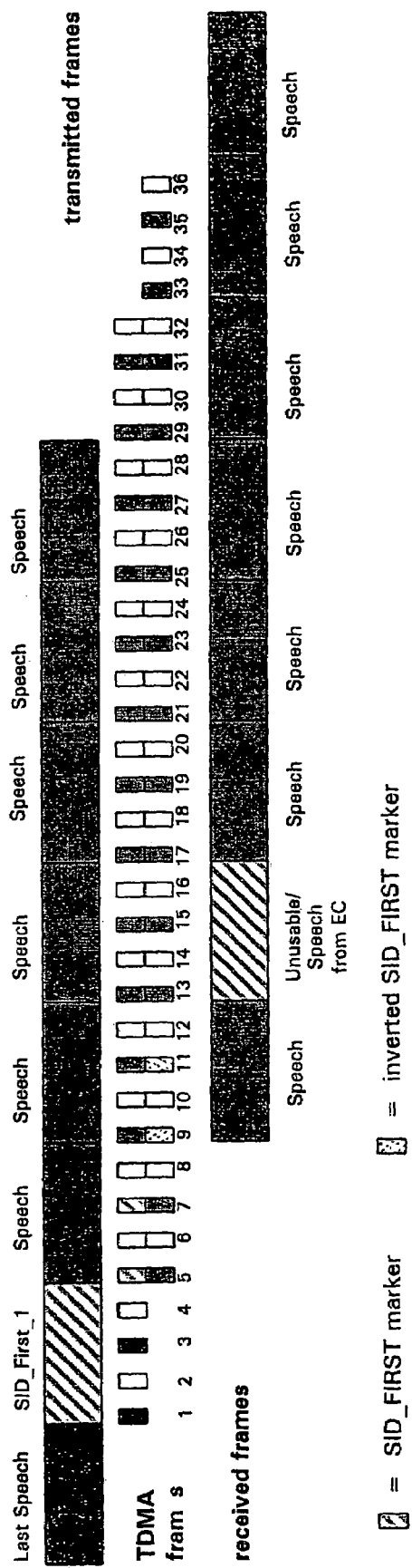
FIG. 9 depicts an exemplary scheme for inhibiting first-SID frames according to the present invention.

To help avoid this problem, a special SID_FIRST inhibit frame is used instead of a regular onset frame when the first half of the TDMA frames carrying the SID_FIRST have been sent but the second half cannot be sent due to a speech onset. The pattern bits belonging to the second half of the SID_FIRST frame, which would have been transmitted, are now inverted. This inhibits the detection of the whole SID_FIRST pattern at the receiver. The codec mode information bits remain the same, as from the original SID_FIRST frame. The receiver will get an unusable frame in the described situation. It is useful to hide this frame by applying proper error concealment (EC) techniques. The described case is illustrated in FIG. 9.

Figure 10:
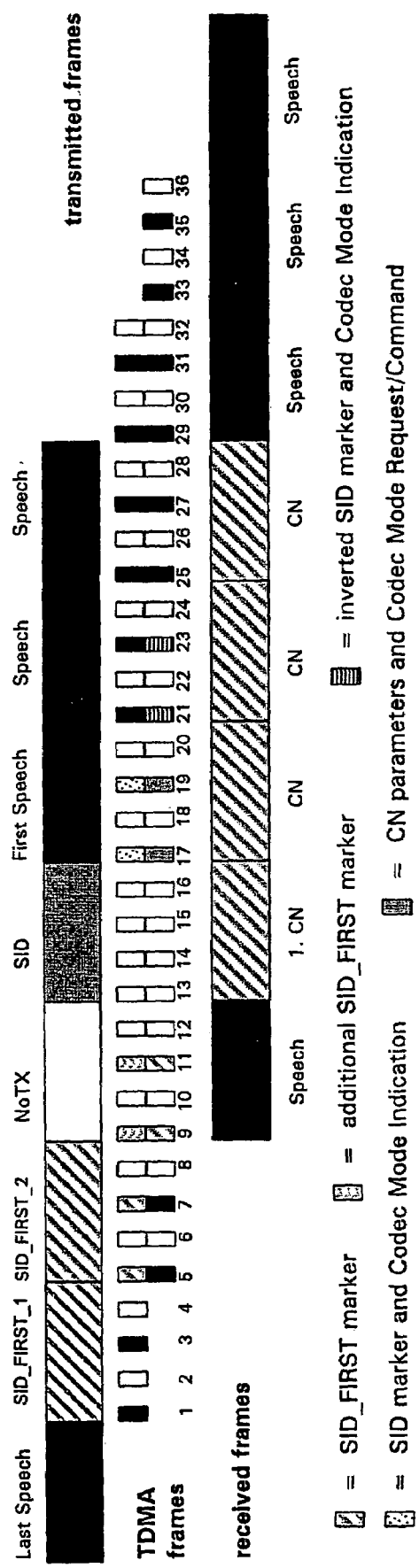
FIG. 10 depicts an exemplary scheme for inhibiting regular SID frames according to the present invention.

Another special frame, namely a SID inhibit frame, is used instead of a regular SID frame when the first half of the TDMA frames carrying the SID have been sent but the second half cannot be sent due to a speech onset. The pattern bits belonging to the second half of the SID frame, which would have been transmitted, are now inverted. This inhibits the detection of the whole SID pattern at the receiver. The codec mode information bits, which represent a codec mode indication, remain the same, as from the original SID frame. The receiver will get an unusable frame in the described situation, for which it will continue to generate CN using the previous CN parameters. The receiver can also check for the patterns that are transmitted in this special case in order to detect speech onsets with improved reliability. The described case is illustrated in FIG. 10.

According to the invention, SID frames are transmitted during inactivity every $n_{FR}$ frames (TCH/AFS) and, respectively, every $n_{HR}$ frames (TCH/AHS). A suitable choice is $n_{FR}=n_{HR}=8$. Phase-aligned transmission and decoding of SID frames (alignment deduced from the SACCH, as in the current GSM system) is one solution existing in today's GSM system, which helps to achieve good SID frame decoding performance. However, the proposed SID frame identification based on gross bit patterns provides that high SID frame detection performance, that more flexible solutions without a fixed phase are possible.

One example is to start transmission of SID frames with the third frame after the transmission of the SID_FIRST pattern, and then to transmit SID frames every 8th frame. An alternative solution is asynchronous SID transmission (i.e., not aligned to any fixed time structure). As an example, SID frames are transmitted whenever a mode request changes, possibly with the constraint that a certain maximum of transmitted TDMA frames per 480 ms multiframe has not yet been exceeded. Another enhanced solution can transmit a SID frame if the CN parameters have changed significantly and certain maximum of transmitted TDMA frames per 480 ms multiframe has not yet been exceeded. Such solutions with asynchronous SID frame transmission can fall back to time aligned transmission whenever certain minimum transmission requirements per time interval have not been met.

Note that the different bit patterns which are sent for identifying the different frame types can partially be corrupted by transmission errors. In order to ensure reliable detection of the patterns also in the presence of channel errors, correlation techniques can be used. One possible solution is to count the number of matching bits, when comparing the received bits with the patterns. As an example, if 70% of the bits coincide, then the receiver can regard the pattern as found. An alternative solution using soft bit information is to accumulate the received soft bits with a positive sign if the corresponding bit of the pattern is 1 and with a negative sign if the corresponding bit is 0. This accumulated measure can be normalized by the product of length of the pattern and the maximal possible soft bit value. If the normalized measure exceeds a certain threshold, e.g. 0.4, the receiver can regard the pattern as found.

One further criterion, which can be used for SID frames, is the CRC of the CN bits. If there is a CRC error, the frame is not regarded as a valid SID frame.

For cost reasons, it is desirable that the identification patterns do not require much memory for storing them. As an example, the identification pattern for SID_FIRST and regular SID for TCH/AFS can be constructed by repeating short 9-bit sequences ceil((228−16)/9)=24 times and then discarding the last 4 bits. Such a 9-bit sequence is, e.g., {0, 1, 0, 0, 1, 1, 1, 1, 0}.

For THS/AHS, it is further important to avoid the possible decoding of a SID_FIRST frame as a regular SID frame, and vice-versa. Therefore, the identification patterns for SID and SID_FIRST are made as distinct as possible.

As an example, the pattern for the SID_FIRST frame can be identical to the pattern used for TCH/AFS. The pattern used for regular SID frames can then be constructed by inverting the SID_FIRST pattern.

The solution to transmit only a special bit pattern and codec mode information in the SID_FIRST frame rather than also transmitting CN parameters helps to keep the DTX efficiency at a maximum (i.e., the activity on the air interface is kept at a minimum). At the same time, the detection reliability of the identification pattern can be maximal since all available bits are used for the bit pattern (except those used for transmission of codec mode information). A problem with this is, however, that the receiver does not get a set of CN parameters for CN generation during the period from end of speech until the reception of the first regular SID frame. The solution is to derive the CN parameters locally in the receiver by using the speech parameters of the last n frames before end of speech. Usually, the encoder operates with hang-over, i.e. even though the VAD detects voice inactivity, a certain number of m frames is still encoded as speech. The decoder can thus derive CN parameters locally by, e.g., averaging the gain and spectral parameters of the hangover frames, i.e. n=m. Another solution is to apply the last received set of CN parameters of a preceding inactivity period.

According to the invention, an AMR receiver incorporates a 2-state model with the states activity and inactivity. The purpose of this state model is to support the speech/SID/non-transmitted frame distinction. Going from activity to inactivity requires the detection of a SID_FIRST frame following speech frames.

Figure 11:
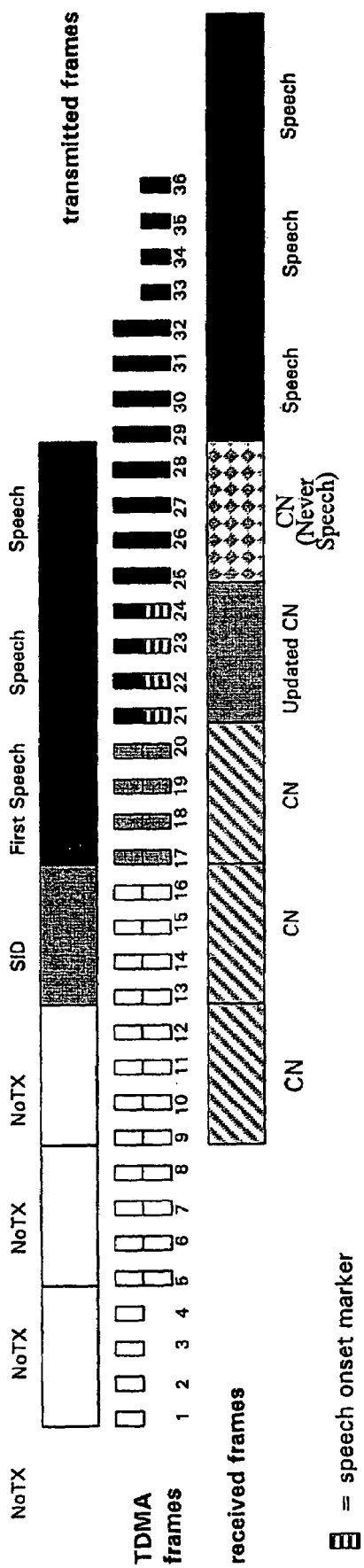
FIG. 11 depicts an exemplary full-rate scheme for detecting transitions from speech inactivity to speech activity according to the present invention.
Figure 12:
FIG. 12 depicts an exemplary half-rate scheme for detecting transitions from speech inactivity to speech activity according to the present invention.

Going from the inactivity to the activity state requires to detect the speech onset identification pattern and a valid first speech frame which can be decoded without CRC error and, optionally, which exhibits quality measurements that are, e.g., derived from the receiver/channel decoder and which exceed certain thresholds. An example is the SFQ measure (gross bit error estimate), which must be below some threshold. The reliability of this state transition can be increased with the constraint that more than one frames must be decodeable without CRC error, and, optionally, not exceeding a certain SFQ measure. Another criterion, as illustrated in FIG. 11, helping to properly detect transitions from inactivity to the activity is that received frames immediately following SID frames can never be a speech frame, provided that block interleaving is used for SID frames which requires less delay than diagonal interleaving for speech frames. FIG. 12 illustrates this criterion for the example of TCH/AHS.

Another way to improve the detection of first speech frames and to help to distinguish them from non-transmitted frames is to access measures from other components of the receiver (e.g., the RF receiver or the equalizer). Examples for such measures are carrier and interferer strength estimates and derived measures such as C/I ratio.

A further way to improve both SID_FIRST and first speech frame identification performance is to transmit the TDMA frames carrying them with increased transmission power.

According to the invention, the following solutions are suitable for defining the codec mode for speech onsets after a period of inactivity:

(a) Selection of the most robust codec mode or, alternatively, with the n-th robust codec mode. The safest solution is to choose n=1. No codec mode indication need to be transmitted. The drawback for n=1 is that, for good channels, a too robust codec mode with low intrinsic speech quality is selected;

(b) Selection of the same codec mode as for the currently active link. This is motivated by the fact that uplink and downlink channel qualities are similar. The transmitting side of the link resuming speech transmission applies the codec mode which it is requesting for the incoming currently active link. The receiving side of the link becoming active again knows the applied codec mode as it is identical with the codec mode requests which it is receiving for application on the outgoing currently active link. The scheme can be made more robust if a mode is selected for speech onsets which is n (e.g. n=1) modes more robust than the mode of the currently active link (provided that such a more robust mode exists).

(c) Selection of the same codec mode which was selected at the end of the last speech period preceding the inactivity period. This is motivated by the fact that radio channel conditions generally do not change very fast. The scheme can be made more robust if a mode is selected for speech onsets which is n (e.g. n=1) modes more robust than the mode which was used at the end of the last speech period (provided that such a more robust mode exists).

(d) Selection according to measurements of the inactive link. As transmission on inactive links is not completely stopped, link quality measuring is possible. Corresponding measurement reports or codec mode requests/commands are transmitted over the active link. When the inactive link resumes speech transmission, a codec mode corresponding to the last received codec mode request is selected.

Advantageously, solutions (a), (b) and (c) above can make use of the fact that no codec mode requests for the inactive link need to be transmitted. The active link can thus save the transmission capacity for codec mode request and use it for some other purpose. An example is to use this transmission capacity for better protected transmission of codec mode indications.

In addition to the above described techniques for performing DTX in AMR systems, the invention further provides techniques for performing fast configuration changes in AMR systems. The purpose of these techniques is to enable fast configuration changes which cannot be done using existing slow control channels. Moreover, existing control channels cannot ensure that configuration changes are synchronized with speech data transmission. Like the above described DTX mechanism, the configuration change mechanism is based on in-band signaling. Applications are, e.g., in connections with tandem free operation (TFO), the change of the active codec set and the change of the phase of the codec mode information (in order to minimize transmission delay). Further general applications are handovers to one of the existing GSM codecs (FR, EFR, HR), or to switch to a future application as, e.g. a wideband codec, speech and data, or multi-media. Like the DTX mechanism, the configuration change mechanism is described with respect to TCH/AFS and TCH/AHS in the GSM system, but is equally applicable in other contexts.

The configuration change mechanism is based on frame stealing similar to the well known FACCH frame stealing (i.e., speech frames are replaced by configuration change frames), and is therefore referred to hereinafter as escape signaling. Since the escape signaling mechanism is used only occasionally during a connection and only few speech frames will be stolen, the error concealment unit at the receiver is able to make the frame stealing virtually inaudible.

According to the invention, escape frames are of similar format as the SID frames described above. They are identified on gross bit level by a particular identification pattern. Like SID frames, they include this pattern and one or two message fields. One field carries the actual channel encoded escape message, the other codec mode information. As an example, the escape frame can include 456 bits and be of exactly the same frame format as SID frames (see, for example, FIG. 4), where the CN field is replaced by the escape message.

The payload to be transmitted by the escape mechanism is called the escape message. Escape messages constitute of a number of net bits, which can be grouped to logical units. For example implementations according to the invention, see GSM 05.09: Digital cellular telecommunication system (Phase 2+); Link Adaptation (draft ETSI EN 301 709 V7.1.0 (1999-11), which is incorporated herein in its entirety by reference.

Escape messages can be channel encoded with any suitable channel coding scheme, as e.g. block or convolutional coding. One cost efficient solution is to use exactly the same channel coding as used for the CN parameters in the SID frame as described above. This means, following the above described example solution with 35 CN bits, that an escape message of 35 net bits is protected with a 14 bit CRC and then convolutionally encoded with a code rate of 1/4 and constraint length k=5.

As with the SID frame, the codec mode information field can carry both block or convolutionally encoded codec mode indication and codec mode command/request.

Escape frames are block diagonally interleaved, like speech frames. This implies, assuming the example solution with an escape frame of 456 gross bits, that an escape frame replaces one speech frame on TCH/AFS and two speech frames on TCH/AHS.

For TCH/AHS, these are not necessarily two consecutive frames, however it is assumed in the described example solution. Not stealing two consecutive frames is advantageous for the error concealment in order to hide the stealing. On the other hand, stealing two consecutive speech frames is beneficial in terms of transmission delay of the escape message. The interleaving is done in such a way, that the first half of the escape frame (228 bits, see FIG. 4) replace the first speech frame. It is important that this first half contains the escape identification pattern. This enables the receiver to check for this pattern. After finding the pattern, the receiver is able to locate the second stolen speech frame, which carries the second half of the escape frame.

In order not to interfere with the regular transmission of codec mode information, the interleaver can further map one of the codec mode information code words on bit positions of the first stolen speech frame. Consequently, the other codec mode information code word is mapped on bit positions of the second stolen speech frame. Furthermore, the placing of codec mode information, i.e. codec mode indication and requests/commands into the codec mode field is done with respect to the codec mode information phase during transmission of regular speech frames. If, e.g., the first half of the escape frame replaces a speech frame which would have carried a codec mode indication, then this first half of the escape frame has still to transmit a codec mode indication.

Note that the above described escape mechanism can also be used in conjunction with the above described DTX mechanism. Thus, according to the invention, escape frames can replace not only speech frames, but also all other types of frames, namely SID_FIRST, regular SID, NoTX, and speech onset frames. Considering the case that an escape frame is to be sent during an inactivity period, it is efficient in terms of transmission resource usage to apply block interleaving, as is done for SID frames. However, since the escape mechanism is targeted to be used only occasionally, transmission resource usage is not the most important criterion. Rather, cost efficient implementation and low complexity is important. Therefore, a beneficial solution is to keep the frame format, channel coding, and block diagonal interleaving, which is also used for escape frames during speech.

Note that using block diagonal interleaving for escape frames during DTX implies that there are half bursts not defined by the interleaving. For TCH/AFS, the odd positions of the first 4 bursts and the even positions of the last 4 bursts carrying the escape frame are undefined. Undefined bits are no problem per se, however, the following problem can be solved by setting the undefined positions appropriately. Consider the case of a speech onset. As described above, a speech onset frame is marked with an onset pattern which both allows for better identifying the frame as an onset and identifying the codec mode used for the onset speech frame. If an escape frame must be sent at the same time, it will replace the onset frame. Thus, for subsequent speech frames, it is more difficult to identify them as speech frames, since the onset pattern was stolen.

Figure 13:
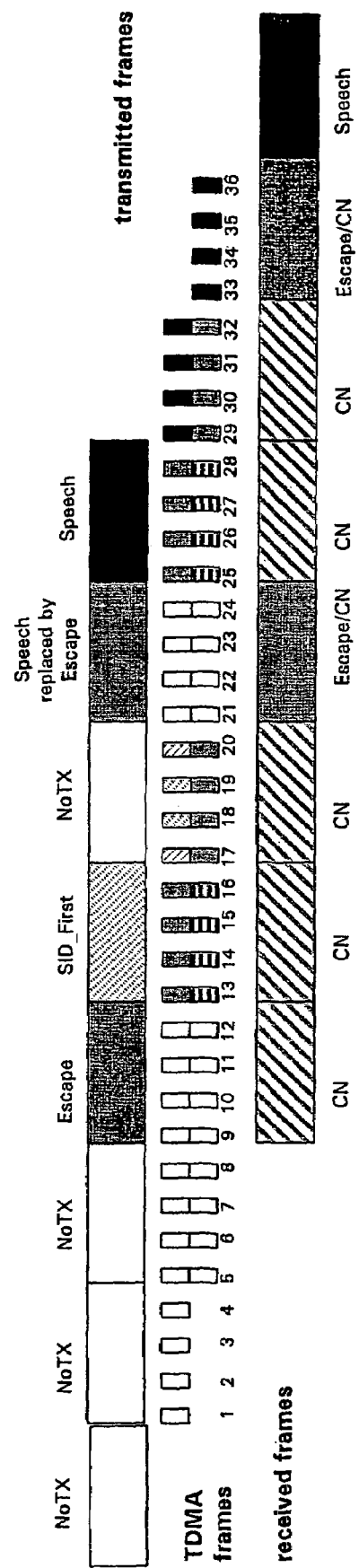
FIG. 13 depicts an exemplary full-rate scheme for detecting a speech onset when a speech-onset indication frame is replaced by a system configuration change frame according to the present invention.
Figure 14:
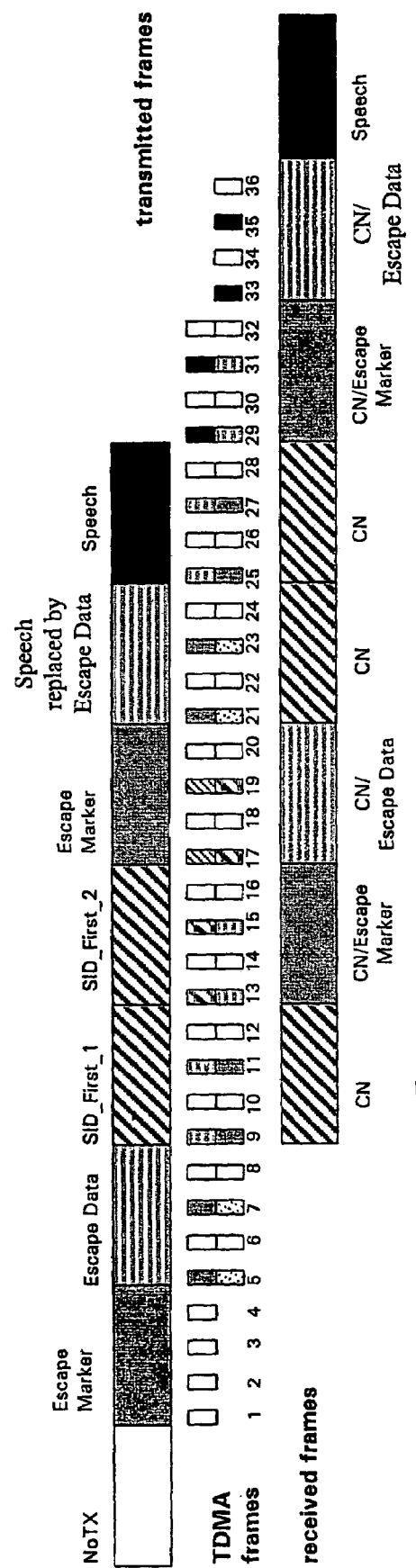
FIG. 14 depicts an exemplary half-rate scheme for detecting a speech onset when a speech-onset indication frame is replaced by a system configuration change frame according to the present invention.

According to the invention, this problem is avoided by filling the first half of the undefined bits (odd positions) with the onset pattern, regardless if there is an onset or not. For the case that there was actually no onset, it needs to be signaled that inactivity continues. Sending SID_FIRST immediately following the escape frame does this. This defines the second half of the otherwise unused bits (even positions). This solution is further beneficial in terms of implementation costs. It allows handling of escape frames, apart from channel coding, exactly as if it was speech. FIGS. 13 and 14 illustrate the described solution with respect to TCH/AFS and TCH/AHS, respectively.

Note that speech frames, which have been stolen for escape purposes, cannot be rescheduled for transmission after the escape, since this would increase the speech transmission delay. However, SID frames that are affected by the escape frame transmission can be rescheduled for transmission immediately after escape frame transmission. Advantageously, this helps to maintain a high subjective comfort noise signal quality. Example solutions are provided in the above cited GSM 06.93.

In order to ensure correct reception of escape messages and to define appropriate routines for error events, an escape protocol is proposed. Example solutions are provided in the above cited GSM 05.09.

Those skilled in the art will appreciate that the present invention is not limited to the specific exemplary embodiments which have been described herein for purposes of illustration and that numerous alternative embodiments are also contemplated. The scope of the invention is therefore defined by the claims appended hereto, rather than the foregoing description, and all equivalents which are consistent with the meaning of the claims are intended to be embraced therein.

The invention claimed is:

1. A method for performing discontinuous transmission (DTX) in an adaptive multi-rate (AMR) communications system in which source data is channel encoded and interleaved for transmission from a first component in the system to a second component in the system, the method comprising the steps of:

detecting by the first component in the AMR communications system, periods of source data inactivity; and transmitting silence descriptor (SID) frames from the first to the second component during the periods of source data inactivity, wherein the SID frames comprise codec mode information; and wherein source data frames are block diagonally interleaved and certain of the SID frames are block interleaved.

2. The method of claim 1, wherein the SID frames comprise comfort noise (CN) parameters.

3. The method of claim 1, wherein the step of transmitting silence descriptor (SID) frames comprises the steps of:

transmitting a first type of SID frame to indicate a transition from source data activity to source data inactivity;

periodically transmitting a second type of SID frame during source data inactivity; and transmitting a third type of SID frame to indicate a transition from source data inactivity to source data activity.

4. The method of claim 1, wherein each SID frame comprises a bit pattern for identifying the SID frame as a particular type of SID frame.

5. The method of claim 4, wherein the bit patterns are gross bit patterns.

6. The method of claim 1, wherein the source data is speech, and wherein the communications system is one of a Time Division Multiple Access (TDMA) wireless system, a Frequency Division Multiple Access (FDMA) wireless system, and a Code Division Multiple Access (CDMA) wireless system.

7. The method of claim 1, wherein escape frames are transmitted to effect configuration changes, and wherein an escape frame can replace a source data frame, a SID frame, or a no-transmission (NoTX) frame.

8. The method of claim 7, wherein escape frames are block diagonally interleaved.

9. The method of claim 7, wherein the escape frame is used to change an active codec set.

10. The method of claim 7, wherein the escape frame is used to change a phase of codec mode information.

11. A method for performing discontinuous transmission (DTX) in an adaptive multi-rate (AMR) communications system in which source data is channel encoded and interleaved for transmission from a first component in the system to a second component in the system, the method comprising the steps of:

detecting by the first component, periods of source data inactivity; and transmitting silence descriptor (SID) frames from the first to the second component during the periods of source data inactivity, wherein the SID frames include codec mode information;

wherein certain of the SID frames are interleaved using a different interleaving algorithm as compared to that used for the channel encoded source data;

wherein active speech source data is block diagonally interleaved, and unused bits within the interleaving scheme for a last speech frame are used for a specific bit pattern to mark end of speech, and wherein unused bits within the interleaving scheme for a first frame are used for a specific bit pattern to mark beginning of speech.

12. A method for effecting configuration changes in an adaptive multi-rate (AMR) communications system in which source data is transmitted from a first component to a second component, said method comprising the step of:

transmitting by the first component in the AMR communications system, an escape frame in place of a source data frame to indicate a configuration change to the second component, the escape frame comprising codec mode information and a gross bit pattern to distinguish the escape frame from source data frames.

13. The method of claim 12, wherein the escape frame further comprises a data field to indicate to the second component a particular configuration change to be made.

14. The method of claim 12, wherein the escape frame is used to change an active codec set.

15. The method of claim 12, wherein the escape frame is used to change a phase of codec mode information.

16. The method of claim 12, further comprising the step of:

transmitting silence descriptor (SID) frames from the first to the second component during periods of source data inactivity, wherein the first component selectively transmits the escape frame to replace the source data frame, a SID frame, or a no transmission (NoTX) frame.

17. The method of claim 16, wherein the step of transmitting SID frames comprises the steps of:

transmitting a first type of SID frame to indicate a transition from source data activity to source data inactivity;

periodically transmitting a second type of SID frame during source data inactivity; and transmitting a third type of SID frame to indicate a transition from source data inactivity to source data activity.

18. The method of claim 17, wherein the step of transmitting an escape frame comprises:

filling a first set of otherwise unused bits with a bit pattern indicating the third type of SID frame in order to ensure detection of a transition from source data inactivity to source data activity; and filling a second set of otherwise unused bits with a bit pattern indicating the first type of SID frame if source data inactivity continues.

19. The method of claim 16, wherein when the escape frame replaces the SID frame, the method comprises rescheduling the SID frame for transmission following transmission of the escape frame.

20. The method of claim 16, wherein source data frames and escape frames are block diagonally interleaved and wherein certain of the transmitted SID frames are block interleaved.

21. The method of claim 12, wherein the codec mode information comprises a codec mode indication that indicates a presently applied codec mode.

22. The method of claim 12, wherein the codec mode information comprises one of:

a codec mode command that indicates a codec mode to be used for transmission from the second component to the first component; and a codec mode request that indicates a codec mode that is preferred for transmission from the second component to the first component.

23. A transmission component for transmitting channel encoded and interleaved source data frames to a receiving component in an adaptive multi-rate (AMR) communications system, said transmission component comprising:

means for detecting periods of source data inactivity;

means for transmitting interleaved silence descriptor (SID) frames to the receiving component in the AMR communications system during the periods of source data inactivity, wherein the SID frames comprise codec mode information; and wherein at least some of the SID frames are block interleaved while the channel encoded source data frames are block diagonally interleaved.

24. A transmission component for transmitting source data frames to a receiving component in an adaptive multi-rate (AMR) communications system, said transmission component comprising:

means for transmitting an escape frame in place of a source data frame to indicate a configuration change to the receiving component in the AMR communications system, wherein the escape frame comprises codec mode information and a gross bit pattern to distinguish the escape frame from source data frames.

25. The transmission component of claim 24, wherein the escape frame further comprises a data field to indicate to the second component a particular configuration change to be made.

26. The transmission component of claim 24, wherein the codec mode information comprises a codec mode indication that indicates a presently applied codec mode.

27. The transmission component of claim 24, wherein the codec mode information comprises one of:

a codec mode command that indicates a codec mode to be used for transmission from the receiving component to the transmission component; and a codec mode request that indicates a codec mode that is preferred for transmission from the receiving component to the transmission component.

28. The transmission component of claim 24, further comprising:

means for transmitting silence descriptor (SID) frames from to the receiving component during periods of source data inactivity; and wherein said means for transmitting an escape frame further comprises means for selectively transmitting the escape frame to replace the source data frame, a SID frame, or a no transmission (NoTX) frame.

29. The transmission component of claim 28, wherein source data frames and escape frames are block diagonally interleaved and wherein certain of the transmitted SID frames are block interleaved.

\* \* \* \* \*